United States Patent [19]

Berlekamp

[11] Patent Number: 4,731,676
[45] Date of Patent: Mar. 15, 1988

[54] TRANSPARENT SYNCHRONIZATION OF MULTIPLE CHANNEL DATA

[75] Inventor: Elwyn R. Berlekamp, Berkeley, Calif.

[73] Assignee: Cyclotomics, Inc., Berkeley, Calif.

[21] Appl. No.: 808,861

[22] Filed: Dec. 13, 1985

[51] Int. Cl.[4] .............................................. G11B 20/20
[52] U.S. Cl. ......................................... 360/26; 360/51
[58] Field of Search ........................ 360/47, 48, 51, 26; 375/116, 118

[56] References Cited

U.S. PATENT DOCUMENTS

| | | | |
|---|---|---|---|
| 3,843,952 | 10/1974 | Husson .................................... | 360/26 |
| 4,143,406 | 3/1979 | Tsuiki et al. ........................... | 360/48 |
| 4,314,355 | 2/1982 | Leighou et al. ....................... | 360/26 |
| 4,356,566 | 10/1982 | Wada et al. ........................... | 375/116 |
| 4,414,676 | 11/1983 | Kraul et al. ........................... | 375/116 |
| 4,453,260 | 6/1984 | Inagawa et al. ...................... | 375/116 |
| 4,524,448 | 6/1985 | Hüllweger ............................. | 375/118 |
| 4,633,486 | 12/1986 | Berlekamp et al. .................. | 375/116 |

Primary Examiner—Raymond F. Cardillo
Assistant Examiner—Surinder Sachar
Attorney, Agent, or Firm—Robert F. Cody

[57] ABSTRACT

In a multi-channel apparatus, a first plurality of N channels support user data and associated error correction and a second plurality of channels each contain a unique p-bit symbol followed by N consecutive M-bit samples of each of the N data channels. The receiver or retriever apparatus regenerates a system clock from all channels and examines the respective bit streams to score each bit phase as a match or a non-match of the sample in the synch channel with each M bit sample of the respective N data streams, and for each such N channels a counter corresponding to the then current phase is incremented or decremented. Relative skew for the N channels is derived from the addresses of the first counter to overflow for each of the N channels.

5 Claims, 7 Drawing Figures

TRANSPARENT SYNCHRONIZATION OF MULTIPLE CHANNEL DATA

FIELD OF THE INVENTION

The invention is in the field of data communication and recording equipment and pertains particularly to synchronization techniques for multi-channel apparatus.

BACKGROUND OF THE INVENTION

The present invention, as well as the pertinent prior art, is conveniently discussed in the context of a multi channel magnetic tape apparatus. Bubble memory, optical storage, point-to-point communication and the like are not excluded from the practice of this invention, but for purposes of specificity and example, reference will frequently be made to multi-track magnetic tape apparatus.

Multi-channel apparatus of the type of interest is most frequently employed to develop information serial by bit in a plurality of channels, to realize byte parallel data for impression on the media and recovery therefrom at a data receiver. It is immediately clear that the mutual synchronization among the data streams on the respective channels is critical and the synchronization of these data streams is the subject of the present invention. It is useful to observe at the outset that the impression on the channel and recovery of the time scale therefrom is not the subject addressed by the present invention: rather it is the relative location on that time scale of correlated events which is sought when the correlation between the several data channels has been disturbed. The nature of such disturbances is determined by the apparatus. For the example of multi-track magnetic tape storage and recovery there are a number of flaws of mechanical origin which contribute skew between the several tracks. It is beyond the scope of this work to address specific causes of skew, drop-outs and like disturbances which disturb the synchrony of the several channels. All such errors will be referenced as mis-alignment or skew regardless of the precise character or nature of the problem.

The conventional practice for such apparatus is to insert synchronization information on each data channel. In order to accomplish this insertion, there must be provided for each channel a buffer accepting user data at a fixed rate and emitting the same user data at an irregular (higher) rate providing gaps in the emitted data stream to accomodate the synchronization information. (No distinction is drawn in this work between data, e.g., user data, and redundancy annexed to such data for error correction purposes.) The synchronization information usually takes the form of a unique bit pattern. The buffer is, at least, of sufficient length to accomodate this gap. Skew, bit slippage, channel noise and other parasitic effects may disturb the information whereby the real-time correlation of the several data streams is degraded. A conventional practice for recovery of synchrony proceeds by recovery of the time scale through observation of the several data streams. For each channel, the bit stream is searched for the synch pattern and the several channels are each labeled by a value of skew or misalignment. The respective data streams are relatively delayed or advanced in accord with the respective skew values to bring the channels back into time alignment.

In a system as described, one observes that bandwidth is consumed in each data channel by the respective synchronization information. Moreover, it frequently occurs that there are overriding constraints on power consumption, weight, or other specifications, notably occuring in space-borne telemetry, which suggest that savings may be realized in accomplishing requisite synchronization.

In the prior art there is known an interleaver/de-interleaver synchronizer apparatus and method for acquiring synchrony on a single data stream, eg. transmitter-receiver synchrony, derived from a coherent reinforcement principle. This arrangement is implemented in a plurality of counters each corresponding to an identifiable discrete bit interval (phase) of an interleaver period. These counters record the relative observed probability for any particular phase within the data stream to be the synch phase. To each phase there is associated a counter which is either incremented (or decremented) in accord with a detected match (or non-match) between a windowed portion of the data stream and a predetermined synch bit pattern. Overflow of a counter indicates in a probablistic sense the synch phase, establishing the synchronous condition. This system is described in U.S. Pat. No. 4,633,486, assigned to Cyclotomics, Inc.

BRIEF DESCRIPTION OF THE INVENTION

The present invention avoids all buffering and clock rate changes at the data source (encoder) by impressing the data directly onto the medium at the user clock rate. The synchronization information is localized onto one or more channels dedicated to this purpose. The dedicated synch channel(s) are constructed by writing a p-length unique bit pattern followed by an M bit extract from each of the N data streams. The procedure is repeated with a resulting periodicity of $M \times N$ bit intervals between the unique synch bit pattern. At the encoder, the user channels "see" the user data source without isolation circuitry intervening. For convenience, this distincting over the conventional buffered synch system is denoted "transparent synchronization".

At the data receiver, the synch channel(s) and the data channels are utilized to reconstitute the (receiver) system clock. This "global clock recovery" (GCR) is not regarded as a novel element of the invention, inasmuch as any GCR subsytem is appropriate for this purpose. As a result of the GCR operation, each user data channel and synch channel has impressed thereon a discrete identifiable time scale.

Acquisition of synchrony is reduced to detection of the skew associated with each user data channel relative to the dedicated synch channel(s). An M-bit window for each data stream is compared with the respective M-bit portion written to the synch channel(s) and a match is recorded by incrementing a counter associated with that phase. In the event of a non-match the associated counter is decremented. Over a number of synch periods a counter overflows for each channel indicating from the associated phase the skew value associated with that channel. The digital delay associated with that channel is adjusted accordingly relative to the synch channel, thereby bringing all user channels into mutual alignment.

DETAILED DESCRIPTION OF THE INVENTION

Figure 1:
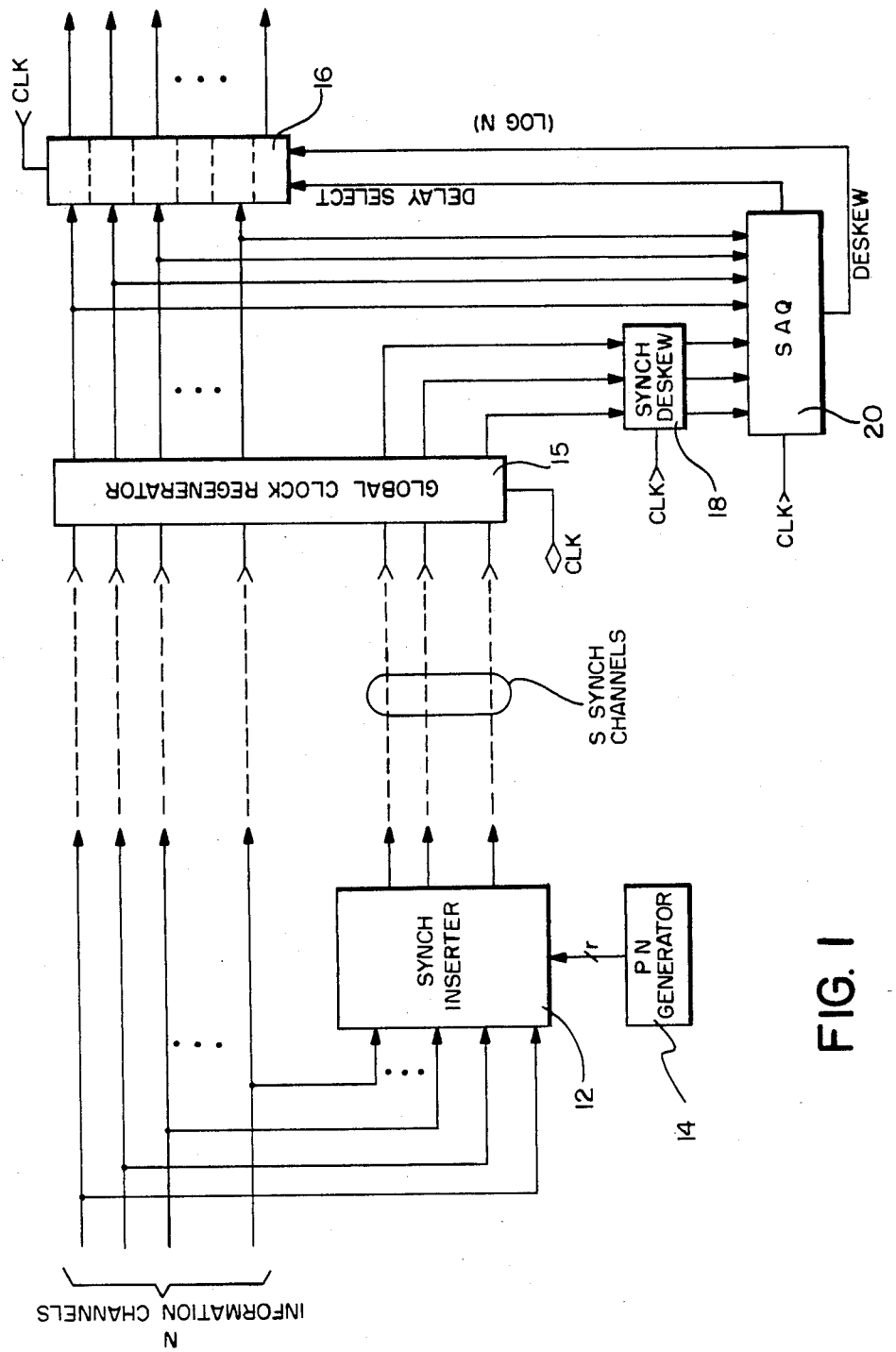
FIG. 1 is a schematic representation of a source-retrieval system.

Turning now to FIG. 1, there is shown an overview of the present invention in the context of a multi-track magnetic tape storage and retrieval apparatus. The N tracks of the apparatus include data tracks as well as any annexed redundancy generated by error correction encoder apparatus and recorded on certain of the N tracks dedicated to that purpose. For present purposes, no distinction need be recognized among the N tracks based upon content identification as user data or error correction redundancy data.

It is emphasized that the N data sources are coupled to the respective channels without intervening buffering or delay. It is from this feature that the terminology ("transparent synchronization") derives.

Transparent synch inserter 12 creates the content of each of s tracks dedicated to the synchronization function. It is desirable to select a $>1$ to assure the integrity of synchronization. The synch inserter 12 includes PN sequence generator 14 for generating a p-bit synch pattern. This pattern is a fixed, pseudo-random pattern for which there is a significant difference between the pattern prefixes and suffices. Where a plurality of synch tracks are used, different sequences are useful to identify the channel in some applications. Generation of this pattern is most easily realized from a read only memory gated at intervals of $p+NM$ bit intervals where M is an integer greater than or equal to one. The significance of M is best illustrated with the aid of the synch inserter timing diagram of FIG. 2 for the case $M=1$. Thus, the synch inserter 12 copies onto the synch track(s), following the p-bit pattern, an M-bit sample of each of the N data tracks. In this way a periodicity of $p+MN$ is created on the synch track(s). The preferred ordering for these synch periods is such that the $M \times N$ bit times of the synch period following the p-bit pattern are occupied by samples realized from corresponding consecutive bit times. Denoting the several tracks as A, B, . . . Z and the phase or bit interval by an appropriate subscript, a synch track would contain the p-bit pattern, followed by $A_1, B_2, \ldots Z_n$. For the generalization of the timing diagram of FIG. 2 to $M>1$, simply reconsider FIG. 2 with the understanding that each of the indexed letters $A_1, B_2, \ldots Z_n$ are to be regarded as M-bit characters for the respective tracks. Consider the extension to the case $M=2$; the first 2 bit times are copied from bit times 1 and 2 from track "A" whereas the next 2 bit times (intervals 3 and 4 of the current synch period) are occupied by a sample copied from track B at corresponding bit times 3 and 4. In the case of plural synch tracks, the different synch tracks contain information of the same format, but the samples are staggered with respect to the other synch track(s). Thus for $s=2$ (and $M=1$) the second synch track commences $M=1$ bits after the first. Another synch track is preferably delayed M (here, one) bit(s) and contain the (or another) p-bit pattern followed by A, B.

The system of FIG. 1 includes appropriate modulation for the N+s channels and demodulation thereof. These are not the subject of the invention and encompass a very wide range of choices even if the physical channels are precisely specified. Accordingly, modulation and demodulation are regarded as part of the channel specification and are thus outside the scope of the present invention.

All N+s channels form the input to global clock regenerator 15 which reconstitutes a master clock for the remainder of the processing.

The received N data streams enter digital delay lines (DDL) 16. these may take the form of shift registers, random access memories (ram's), gated flip-flops, etc. Each DDL is capable of accomodating a selected delay interval. The signal DESKEW quantifies the delay magnitude (or alternatively, embodies a gate pulse) and the log N lines DELAY ADDRESS serve to identify which data stream is to be retarded or advanced by the magnitude of the DESKEW signal. As a practical matter the maximum length relative delay/per channel is one synch period. The s synch channels are separately deskewed in SDSKEWR 18. This operation may be regarded as removing that predetermined skew, or stagger, introduced by synch inserter 12. The synch acquirer (SAQ) 20 performs a search on each of N information streams and compares the relevant portions of the s synch channels within each period to locate same. The location on the relative time scale is the amount of phase misalignment to be compensated and appears encoded in the signal DESKEW as a quantity for controlling the relative delay of the each of the N corresponding information streams.

Figure 2:
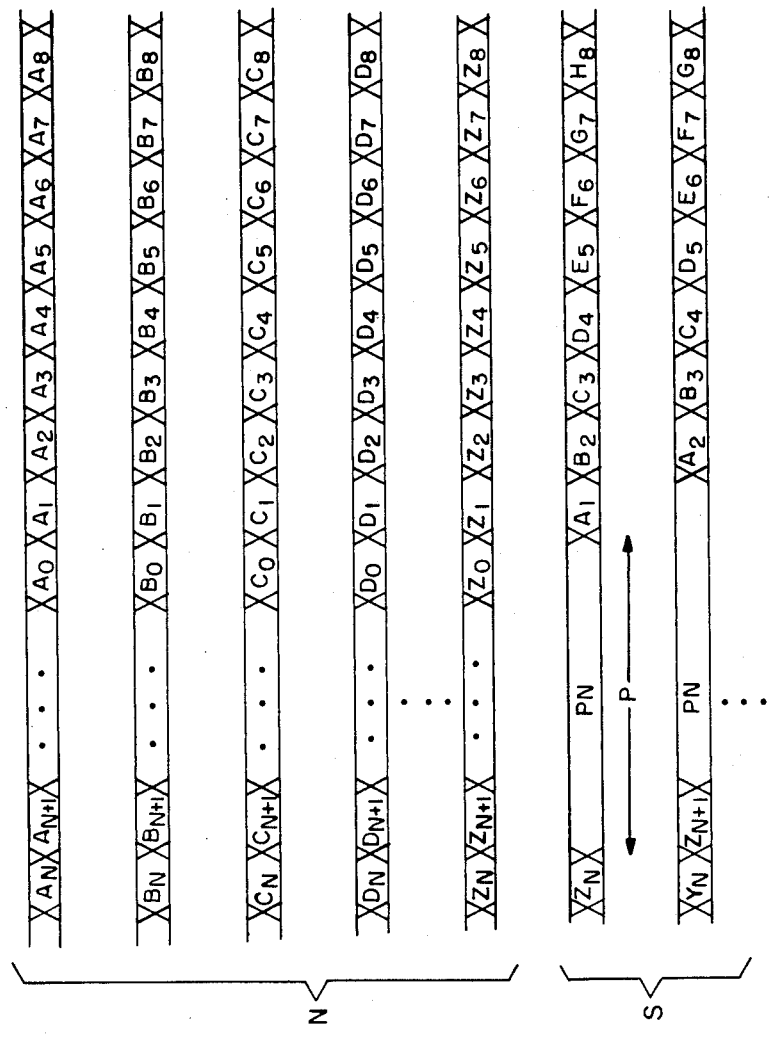
FIG. 2 is a timing diagram for the synch insertion of the present invention.
Figure 3:
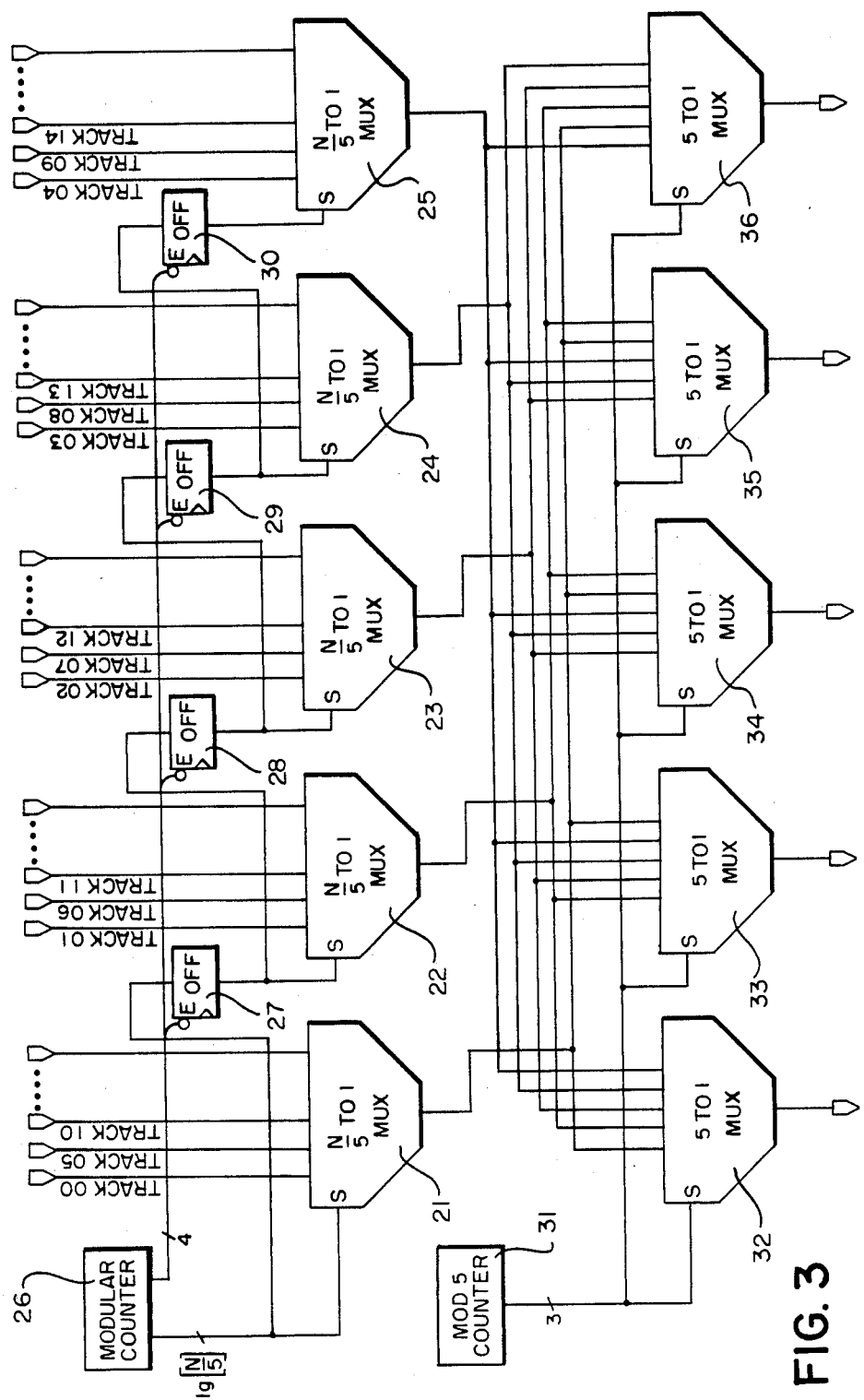
FIG. 3 represents an exemplary synch inserter of the present invention.

The generation of the synch insertion sequence of FIG. 2 is accomplished in a preferred manner using a first set of multiplexers (MUXes) to sample the several tracks and produce an intermediate set of signals; the intermediate set of signals are then ordered and selected in a second set of MUXes. An example is given in FIG. 3 where for an indefinite number of tracks, N, five synch tracks are to be created. The N/5-to-1 MUXes 21,22,23,24 and 25 are grouped for convenience by track addresses (mod 5). The select lines S to each MUX 21–25 propagate through delay flip flops 26,27,28 and 29 to each of the MUXes 21–25 in a desired sequence to produce the example intermediate signal set of Table 1:

TABLE 1

| MUX / | Example intermediate sequence for s = 5 synch inserter. TIME → address of tracks sampled by MUX2x) | | | | | | | | | | | |
|---|---|---|---|---|---|---|---|---|---|---|---|---|
| 21 | 0 | 5 | 5 | 5 | 5 | 5 | 10 | 10 | 10 | 10 | 10 | 15 | 15 |
| 22 | 1 | 1 | 6 | 6 | 6 | 6 | 6 | 11 | 11 | 11 | 11 | 11 | 16 |
| 23 | 2 | 2 | 2 | 7 | 7 | 7 | 7 | 7 | 12 | 12 | 12 | 12 | 12 |
| 24 | 3 | 3 | 3 | 3 | 8 | 8 | 8 | 8 | 8 | 13 | 13 | 13 | 13 |
| 25 | 4 | 4 | 4 | 4 | 4 | 9 | 9 | 9 | 9 | 9 | 14 | 14 | 14 |

The modular counter 26 generates the select addresses and the four enables for the D flip flops 27–30. It is these latter which implement the desired time sequencing between the samples taken by the respective MUXes 21–25.

The intermediate signals of Table 1 are to each of the five 5-to-1 MUXes 32,33,34,35 and 36, each driven in turn by mod 5 counter 31. The latter furnishes the correct select address (mod 5) to each of the 5-to-1 MUXes 31–35. It is apparent that the 3 bit select addresses can be permuted to the respective MUXes to provide desired selection, or in like manner, the inputs may be so permuted among the respective MUX inputs to produce the desired concurrent outputs to the 5 synch channels.

Retrieval of data begins with recovery of a common time scale upon which the totality of the parallel information streams (user data and synch track content) can be superimposed. A representative global clock regeneration (GCR) function may be obtained from the structure described in U.S. patent application Ser. No. 518,995 entitled "Digital Time Base Correction" filed Aug. 1, 1983 by Elwyn R. Berlekamp et al.

Figure 4:
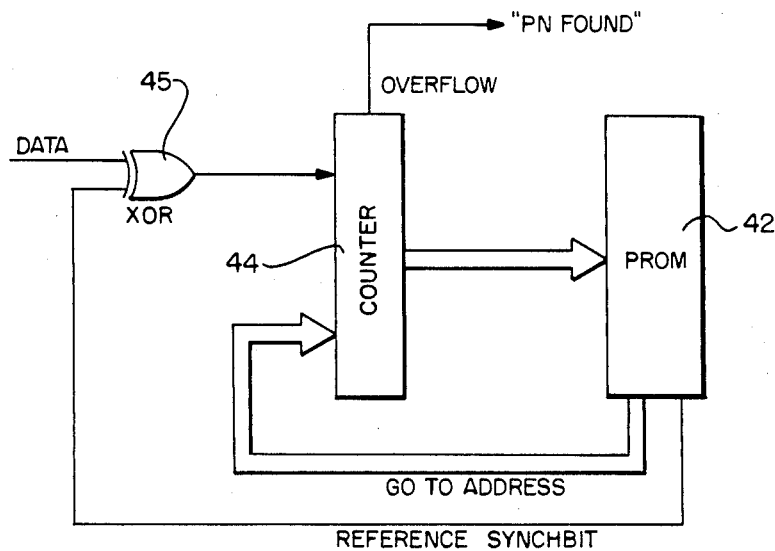
FIG. 4 is a schematic example of a representative PN sequence detector.

The result of the GCR function is that a discrete identifiable time interval is assignable to all events of the information stream. The relative location on this regenerated time axis for (originally) correlated events is to be determined to correct for the misalignment introduced by the channel(s). Relative locations on the regenerated time axis are conveniently measured with regard to an origin, here furnished by the PN sequence in each channel for each synch period. Thus for each of the s channels, the respective PN sequence is to be located. Well-known structure exists for this purpose. One representative PN sequence detector for use in synch deskewer 18 comprises a simple sequential state machine implemented according to FIG. 4 using little more than a prom 42 and counter 44 to provide addresses to prom 42. The prom content includes the desired PN sequence. A bit read from prom 42 (a "reference synchbit") is exclusive-orred by XOR 45 with an incoming bit from the synch channel information stream. The result of this operation determines whether counter 44 advances to its next state (reference synch bit=channel bit) or in the alternative, the counter resets to its base state. The next state of the counter is jammed to counter 44 from another field of the prom word which furnished the reference synchbit. The p-bit pattern comprising the PN sequence is located in the last p words of the prom 42 and the earlier addresses contain irrelevant information in the synchbit field except that the p-bit pattern must not appear. After each match is detected, the counter advances to the next state which is a "goto" address furnished from prom 44. When the p bits of the PN sequence have been detected the final advance causes an overflow condition which is treated as a signal PN FOUND to control the deskewing of that s channel.

Figure 5:
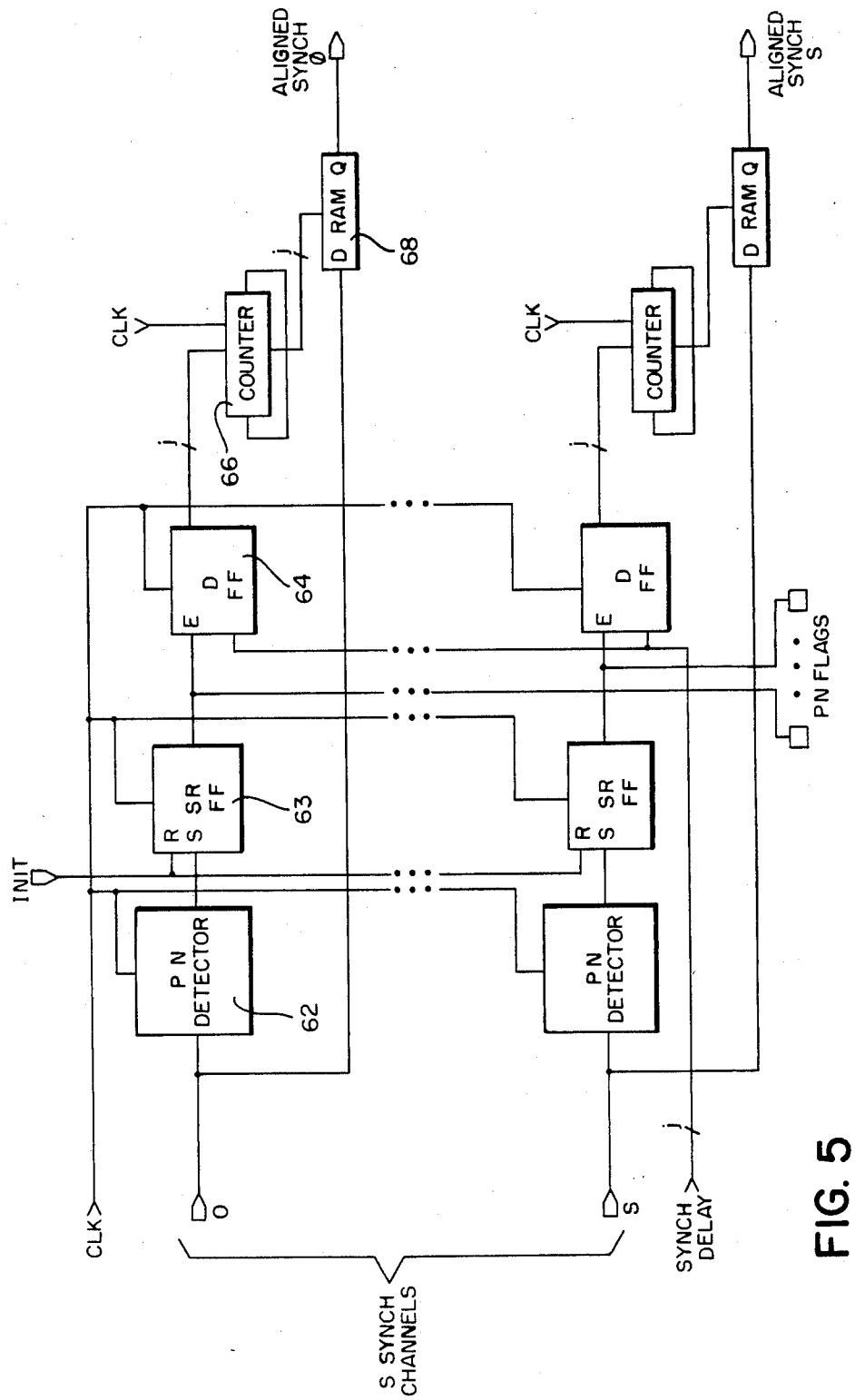
FIG. 5 shows a schematic implementaion of a portion of a synch deskewer of the present invention.

As described above, a deliberate M-bit skew is introduced between the s synch tracks by the synch inserter 12. It is convenient (although by no means essential) to return the several synch tracks to time alignment whereby all synch tracks emit respective PN sequences concurrently. The alignment of the synch channel bit streams in synch deskewer 18 is preferably accomplished in the manner shown in FIG. 5. Each s channel has associated a PN detector 62, which upon detection of the PN sequence sets flag in the form of R-S flip flop 63. The first such flag to be set, as determined through an ORing structure (not shown), generates a SYNCH DELAY quantity which is particular to each of the synch channels. The first channel to detect its PN sequence (definig a delay of zero) also enables its own D flip flop. The other D flip flops will be enabled upon the detection of their respective PN sequences. The mediation of the relative delays between these occurences is treated in a straightforward manner and the result furnished to each channel to initialize through its D flip flop(s) 64 the respective modulus counter 66. The value jammed to this counter represents the delay required. Counter 66 is coherent with the receiver clock and runs continuously, furnishing addresses to ram 68. Incoming data from the respective synch channel enters this ram in a write-after-read mode (same address) thereby forming a digital delay line.

Figure 6:
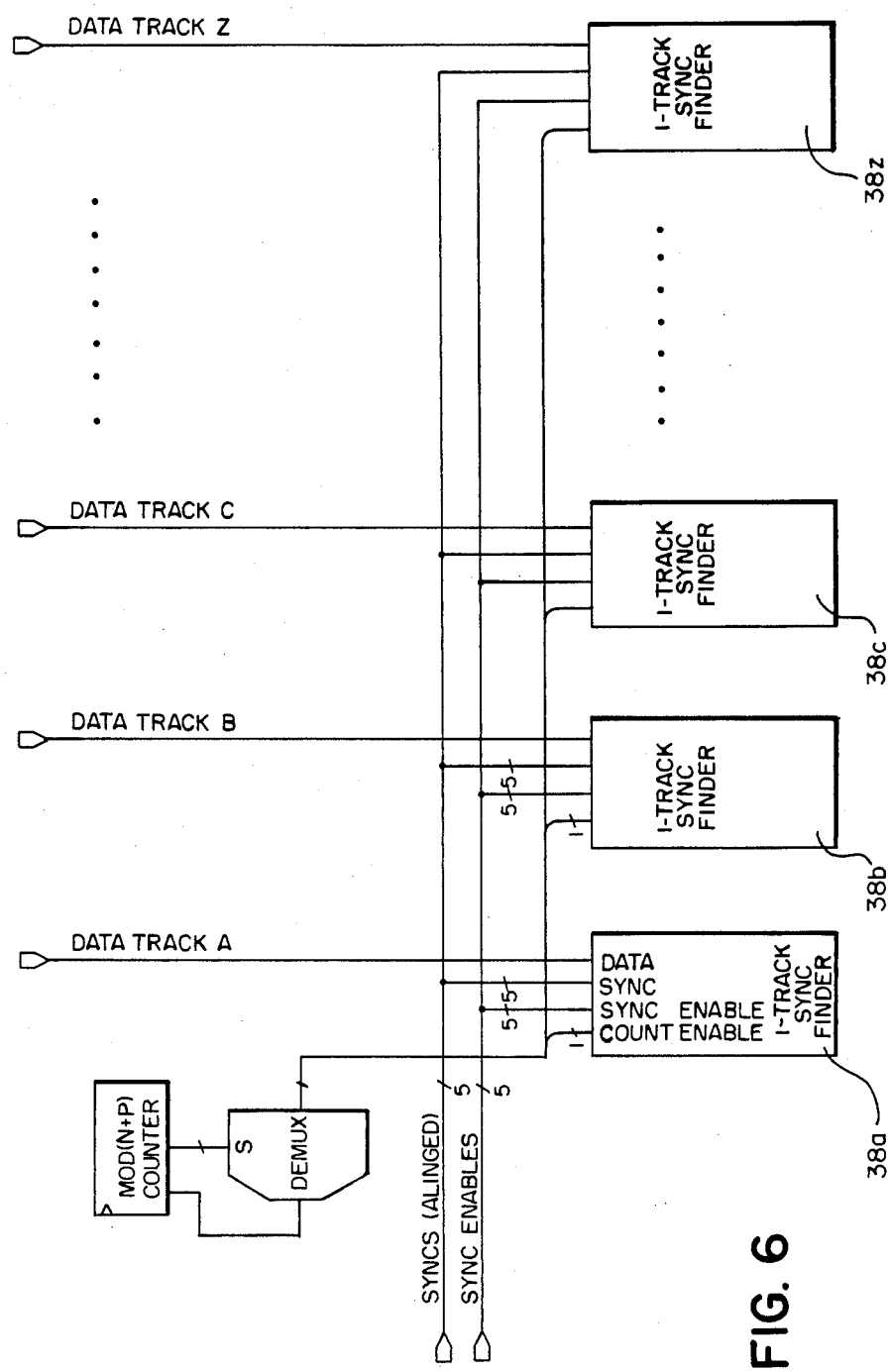
FIG. 6 illustrates an exemplary synch acquirer.
Figure 7:
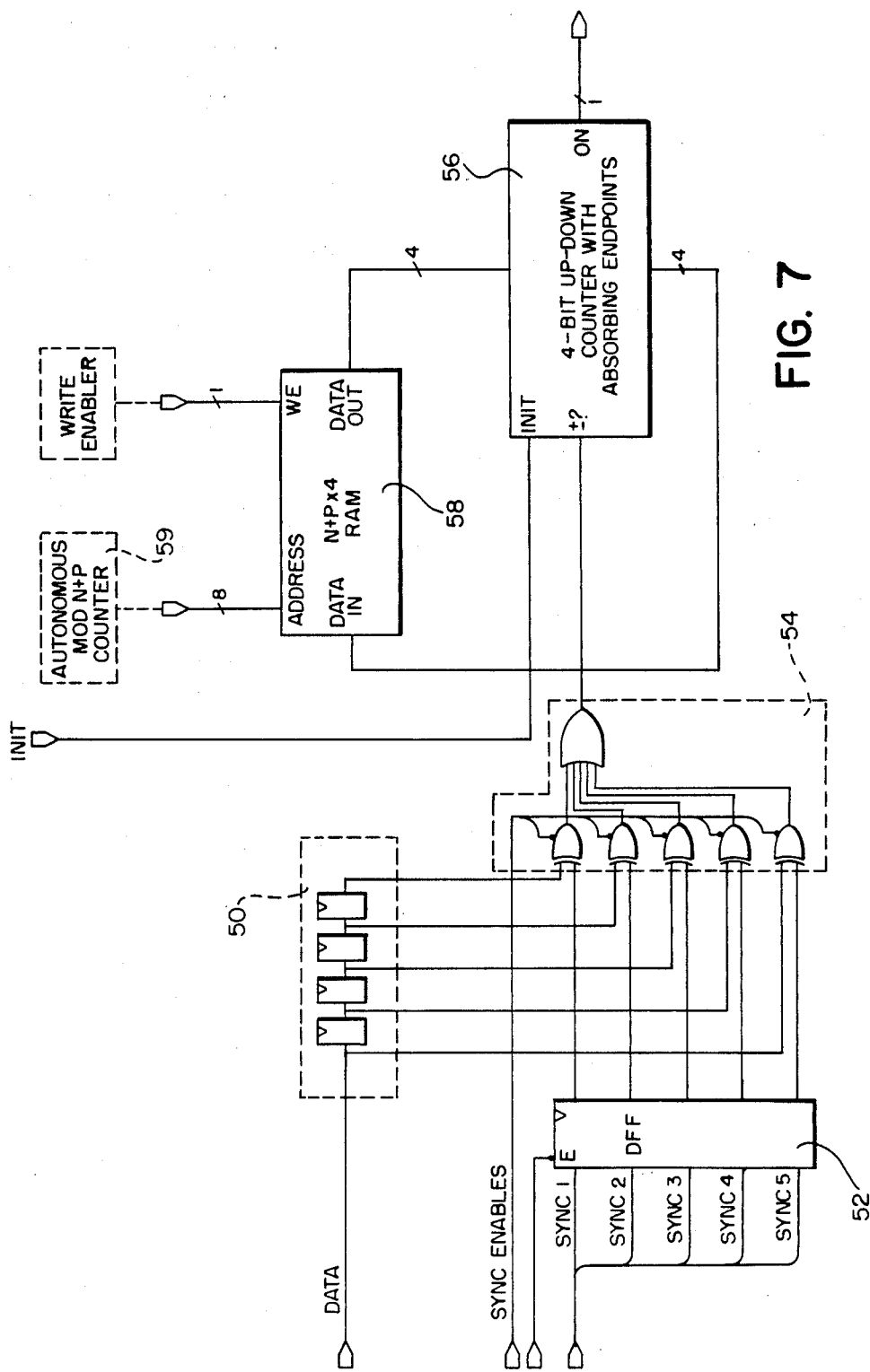
FIG. 7 illustrates an exemplary synch finder module.

The processing of each track for determination of the skew thereof is conveniently described on a "per track" basis. The organization of the subsystem for achieving this is given in FIG. 6 where there is associated with each of the N data tracks, A, B, C, . . . Z, a corresponding synch finder 38a, 38b, 38c, . . . 38z. FIG. 7 describes the operational structure of one such synch finder module 38. In this example, the parameter M=1; consequently, 1 bit from each of the s (=5) synch tracks is presented to register 52 for retention for the synch period of N+p bit intervals. It will be recalled that one of the functions of the synch inserter was to copy these 1 bit samples from this track at successive intervals of predetermined skew. It is now to be determined whether that predetermined skew has been preserved or disturbed by the corresponding channel. The alignment of the deskewed synch tracks presents these 5 one-bit samples concurrently. The data track content is likewise presented to the synch finder serially through shift register 50. This shift register simply compensates the known, predetermined skew created by the synch inserter 12. The content of the composite synch pattern from register 52 and the data track content of (SIPO) shift register 50 is presented to comparator 54. If there has been no disturbance with the correlation of data and synch tracks, the comparator output will increment the bi-directional counter 56. The counter may have any desired dynamic range: the length of the counter limits the precision with which the probability for erroneous synchronization is known. In practice 4 bits is adequate to measure the relative confidence with which skew probability is measured instantaneously. Algebraic counter 56 has the property that no increments can affect the magnitude of the algebraic counter once having reached maximum capacity and that this maximum counter condition sets an overflow flag ("HIT"). In similar fashion, decrements of algebraic counter 56 do not alter the algebraic counter output below its minimum value. There is no requirement for an underflow condition. Ram 58, driven by mod (N+p) counter 51, retains the output of algebraic counter 51 for each of the discrete, identifiable phases of the synch period.

The content of the algebraic counter 56 is initialized at start up and upon loss of the synchronous condition to a bias from which increments and decrements produce a rapid convergence upon the characterization of each particular phase of the N+p phases of the synch period. This synch acquisition strategy has been discussed in U.S. Pat. No. 4,633,486. An initial value for each of the N+p phases rapidly decreases for all "incorrect" phases, and steadily increases for the particular "correct" phase. For the 5 bits of the 5 synch tracks of this example, a decrement occurs with probability 31/32 and an increment occurs with probability 1/32.

The first cell of the ram 58 which overflow, with high probability, marks the pattern matching the sample copied to the synch track(s). Thus the address of this 4-bit word is identified with the matching phase and therefore the skew associated with the track in question is determined. This condition is detected by the HIT signal transition. The corresponding data track information stream is advanced or retarded in a digital delay line according to the skew value so determined (the address of the overflowing word of ram 58). The digital delay line may be implemented in write-after-read ram using well known techniques.

The probability of encountering an accidental HIT or "mis-synch" can be calculated in a random walk model. Consider an infinite counter with count down probability p and count up probability q=1−p. At the end point where the count is 1, the counter remains at the count of 1 with probability p and increments to 2 with probability q. A decrement condition at the count of 1 does not decrease the count but causes an underflow condition. This model corresponds to the content of the words of ram 58 which record the correct phase probability for each phase of a corresponding channel. (For mathematical convenience the model is reversed in counting direction.) Let the model counter initially contain count z and let u(z,n) be the probability that the underflow condition occurs at least once in n steps. For z>0 and n>=0, $$u(z,n+1)=p*u(z-1,n)+q*u(z+1,n)$$

The boundary conditions for the difference equation above are $$u(z,0)=0 \text{ for } z>0$$

$$u(0,n)=1 \text{ for } n=0$$

The probability that the coaunter has never attained the underflow condition after n steps can be obtained from the expression above as $$v(z,n)=1-u(z,n)$$

For various values of p, the quantities u and v can be computed. The relevant values of p are $(\frac{1}{2})**k$ and k * (0.0001) to accomodate examples of M and s ranging over k. Values of $1 \leq k \leq 6$ have been considered. The accidental occurence of the k-bit sample will contribute to an incorrect synch indication.

Consider one of the N+s channels with input bit error rate of 0.0001. A probability counter associated with the correct phase will synchronously advance toward the synch condition with probability $p=k*(0.0001)$ and the incorrect phase associated counters encountering a spurious synch pattern advance with probability $(\frac{1}{2})**k$. If after n steps, there is a misynch in the particular data channel, the condition suggests that (a) the "correct" counter has never reached the synch condition (underflow in the mathematical model), or that (b) the "incorrect" phase associated counter has reached the synch condition.

The upper bound for mis-synch probability is $$[(\text{Number of phases})-1]*u(z,n)+v(z,n)$$

where there is one correct phase counter and the rest are incorrect. Assume N=300 channels and the bit error rate of 0.0001. The mis-synch probability decreases below the quantity in column d of Table 2 after the elapse of the time in column c.

TABLE 2

| Mis-synch probabilty for values of M and s | | | |
|---|---|---|---|
| (a) Number of consecutive synch bits M | (b) Number of Synch Tracks s | (c) Time Elapsed in Millisec. | (d) Mis-Synch Probability ($\times 10^{**-5}$) |
| 1 | 6 | 0.14 | 1.7 |
| 1 | 5 | 0.16 | 1.8 |
| 1 | 4 | 0.18 | 6.8 |
| 1 | 3 | 0.22 | 3.8 |
| 2 | 3 | 0.26 | 1.7 |
| 2 | 2 | 0.32 | 6.8 |
| 3 | 2 | 0.37 | 1.7 |
| 3 | 1 | 0.58 | 3.9 |
| 4 | 1 | 0.60 | 6.8 |
| 5 | 1 | 0.67 | 1.8 |
| 6 | 1 | 0.72 | 1.7 |

Since many changes can be accomodated in the above embodiment and many apparently widely different embodiments of the invention can be made without departure from the scope thereof, it is intended that all matter contained in the above description or shown in the accompanying drawings shall be interpreted as illustrative and not in a limiting sense.

What is claimed is:

1. A multi-channel digital communication apparatus supporting a first plurality of N, where N is an integer, data streams each corresponding to a channel of said apparatus and at least one further channel for synchronization among said first plurality of data streams, synchronization inserter means for establishing on said synchronization channel at M×N, where M is an integer discrete intervals a unique p-bit where p is an integer pattern followed by an M-bit subsequence copied from a selected portion of each of said N data streams, receiver synchronization means comprising:

(a) clock restoration means for establishing an identifiable sequence of discrete intervals for each N data streams and synchronization channels, (b) comparison means for comparing each M-bit subsequence with each M consecutive bits of an M×N bit interval of respective data streams of respective ones of said channels, (c) a first plurality counter means, each counter means corresponding to a respective one of said data channel, each counter means comprising M×N tally means, each tally means corresponding to an identifiable discrete time interval, said counter means responsive to said comparison means to increment respective tally means for each identity of M-bit subsequences detected by said comparison means and to decrement said respective tally means for each non-match of said M-bit subsequences detected by said comparison means, whereby after a plurality of p+(M×N) bit intervals the respective skew in each said N channels is determined from the relative offset of the tally means of maximum content of each said channel, (d) digital delay means associated with each of said N channels, each said digital delay means responsive to the corresponding skew value to delay said channel in accordance with said skew value, whereby said N channels are re-aligned to exhibit synchrony.

2. The apparatus of claim 1 wherein said M×N bits correspond to a consecutive sequence of M×N time intervals.

3. The apparatus of claim 1 comprising a plurality of said synchronization channels, said source synchronization means establishing on said synchronization channels respective different M-bit subsequences from each said N data streams.

4. The apparatus of claim 3, wherein each said synchronization channel contains at least one unique p-bit pattern and a plurality of N×M-bit subsequences derived from respective N data streams, each M×N bit sequence comprising bits associated with consecutive identifiable time intervals, said consecutive identifiable time intervals staggered by a predetermind amount.

5. The method of establishing synchronization among a plurality N+s where N and s are integers information streams comprising N data streams and s synchronization streams, said information streams extant on N+s respective communication channels, comprising the steps of:
- (a) associating s said channels for synchrony information and N said channels for data excluding synchrony information,
- (b) writing each of said N information streams to respective ones of said N channels,
- (c) writing to each of said s channels a unique p-bit pattern, then copying to each said of s channels an M-bit where p and M are integers subportion of the M×N bit portion of said respective data stream, whereby each of said s channels contain at least one synchronous information period comprising p+(Mk), where k is an integer bits,
- (d) recovering from the aggregate of said N+s channels identifiable consecutive discrete time intervals,
- (e) associating with each of said identifiable discrete time interval a counter to record the detection or non-detection of a condition consistent with one particular identifiable discrete time interval,
- (f) extracting from each of said s channels the plurality of N M-bit subsequences, and comparing each said M-bit subsequence with the respective data stream from which said M-bit subsequence was originally derived in step (c) and incrementing or decrementing respective ones of said counters in accord with the comparison step resulting in a determination of identity or non-identity of said extracted M-bit sequence with the data stream from which said M-bit sequence was copied, each one of said counters being associated with a respective current bit time,
- (g) changing said counters in consecutive order in response to said master clock,
- (h) detecting the overflow condition first to occur for each of the N sets of said counters, and associating a skew value to each of said N channels from the position of respective overflowed ones of said counters, and
- (i) delaying each of said N data streams by an amount consistent with the corresponding skew value.

* * * * *